Dec. 20, 1966  J. P. BROGDON  3,293,400
SUBMERGED ARC WELDING PROCESS
Filed July 6, 1966  2 Sheets-Sheet 1

INVENTOR.
BY Julian P. Brogdon
Shoemaker and Mattare
ATTORNEYS

Dec. 20, 1966  J. P. BROGDON  3,293,400
SUBMERGED ARC WELDING PROCESS
Filed July 6, 1966  2 Sheets-Sheet 2
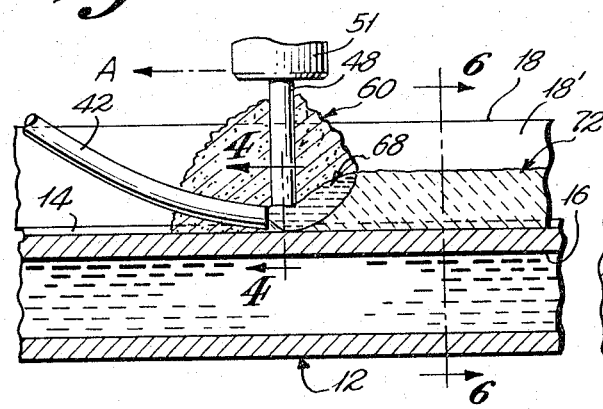
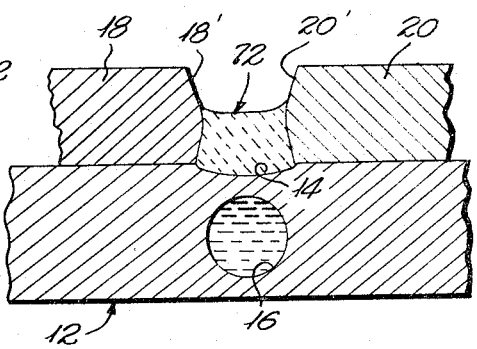
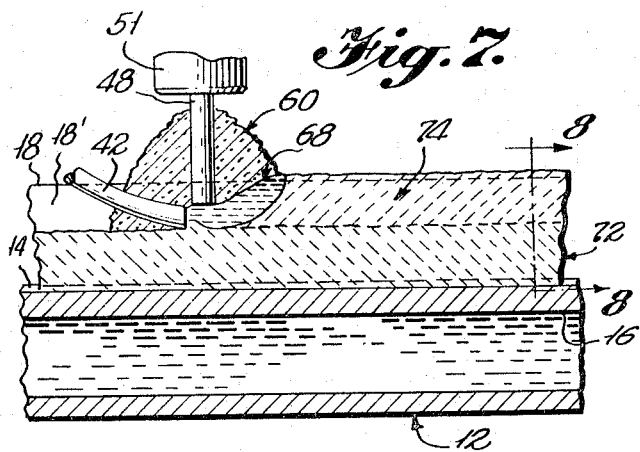
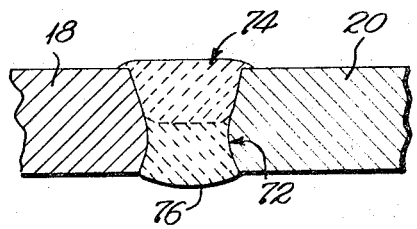
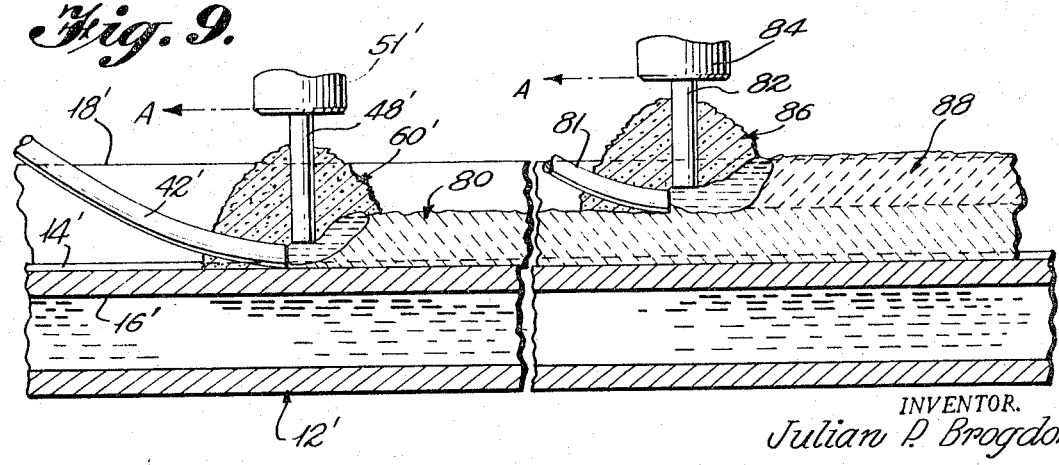
INVENTOR.
Julian P. Brogdon
BY
Shoemaker and Mattare
ATTORNEYS

United States Patent Office 3,293,400
Patented Dec. 20, 1966

3,293,400
SUBMERGED ARC WELDING PROCESS
Julian P. Brogdon, Hampton, Va., assignor to Newport News Shipbuilding and Dry Dock Company, Newport News, Va., a corporation of Virginia
Filed July 6, 1966, Ser. No. 563,149
8 Claims. (Cl. 219—73)

The present invention relates to a new and novel submerged arc welding process, and more particularly to seam welding wherein the welding is performed entirely from one side of the workpieces.

It is highly advantageous to weld certain workpieces entirely from one side thereof, particularly for example wherein the workpieces are of considerable size. When the workpieces are of large dimension, and wherein it is necessary to turn the workpieces over to weld on the opposite side thereof, it is apparent that a considerable amount of vertical clearance must be provided to enable such operations. On the other hand, if the welding can be carried out entirely from one side of the workpieces, the amount of required vertical clearance is substantially reduced. Accordingly, a great saving in time as well as the size of the required physical facilities is realized.

In the prior art, methods have been proposed for welding entirely from one side of workpieces, and a particular problem in this type of process is to provide a satisfactory underbead on that side of the workpieces opposite to that from which the welding operation is carried out. In such processes, a back-up means is employed for supporting a molten puddle of metal during the welding process, and this back-up means has been provided with cooling means so as to chill the molten puddle in an effort to produce an effective barrier layer of solid flux at the bottom of the groove. If such an effective barrier layer can be formed, it has the beneficial result of keeping the molten puddle away from the back-up means and insulating the arc from the back-up means to prevent melting of the back-up means and poisoning of the weld, thereby ensuring that a satisfactory underbead will be formed. It has been found that the provision of a chill back-up means is not sufficient to produce the desired results.

In the present invention, a unique concept is employed in providing a cold wire in addition to the usual hot wire used in a submerged arc welding process. The hot wire as is conventional comprises the electrode having welding current passing therethrough. The welding arc is formed between this electrode and the workpiece. On the other hand, the cold wire as employed in the present invention is at ground potential and is not heated in the same manner as the hot wire. The cold wire in the present invention is disposed at the bottom portion of the groove formed in the back-up means and beneath the hot wire, the cold wire being disposed such that it is normally positioned forwardly of the hot wire in the direction of travel of the wires along the weld area.

This cold wire augments cooling of the flux within the groove adjacent to the surface of the groove and has been found to effectively produce a solid flux layer which serves as the desired barrier layer as discussed hereinabove. This not only provides a smooth, shiny underbead which exhibits good reinforcement and which does not have to be ground subsequent to the welding process, but it further prevents the back-up means from being damaged as may be the case where the arc comes into contact with the back-up means.

Welds formed according to the process of the present invention have exhibited good fusion and pass all standard tests required for this type of weld.

In certain cases, one pass of the hot and cold wires employed in the present process may be sufficient for completing the weld between the two workpieces. In other cases wherein the thickness of the workpiece is greater, more than one pass may be necessary. A feature of the present invention is to provide a tandem arrangement wherein a second pass of a hot and cold wire may be employed in trailing relationship to the first pass. It is advantageous to provide the cold wire in the second pass since the presence of the cold wire prevents refusion of the first layer of metal formed by the first pass. Refusion of the first layer causes the underbead to lose some of its desired characteristics and it is accordingly important to prevent this from happening. The presence of the cold wire in the second pass permits a high rate of deposition without the necessity of lowering the welding current to prevent such refusion. It is of course apparent that the second pass may be carried out at any time subsequent to carrying out the first pass, and a particular feature of the present invention is the aforementioned tandem arrangement wherein the second pass is made in trailing relationship to the first pass so as to provide a tandem arrangement.

An object of the present invention is to provide a new and novel submerged arc welding process for seam welding workpieces entirely from one side thereof.

Another object of the invention is the provision of a submerged arc welding process which effectively prevents material of the back-up means employed in the process from poisoning the weld.

Still another object of the invention is to provide a submerged arc welding process which provides good fusion and wherein the completed weld passes all standard tests.

Yet another object of the invention is the provision of a submerged arc welding process which provides a smooth, shiny underbead to the completed weld which exhibits good reinforcement and which does not require grinding thereof.

A still further object of the invention is to provide a submerged arc welding process wherein first and second passes can be carried out substantially simultaneously with the second pass being in trailing tandem relationship with the first pass and wherein a high rate of deposition is obtained with the second pass while preventing refusion of the metal layer formed by the first pass.

A further object of the invention is to provide a submerged arc welding process which is quite simple and effective in operation and which can be carried out in a substantially automatic manner.

Other objects and many attendant advantages of the invention will become more apparent when considered in connection with the specification and accompanying drawings, wherein:

FIG. 5 is a view similar to FIG. 2 illustrating an intermediate step in carrying out the method of the present invention;

FIG. 6 is a sectional view taken substantially along line 6—6 of FIG. 5 looking in the direction of the arrows;

FIG. 7 is a sectional view similar to FIG. 5 illustrating a further step in carrying out the method of the present invention;

FIG. 8 is a sectional view taken substantially along line 8—8 of FIG. 7 looking in the direction of the arrows; and FIG. 9 is a longitudinal section through typical apparatus illustrating a tandem arrangement for carrying out the method according to the present invention.

Figure 1:
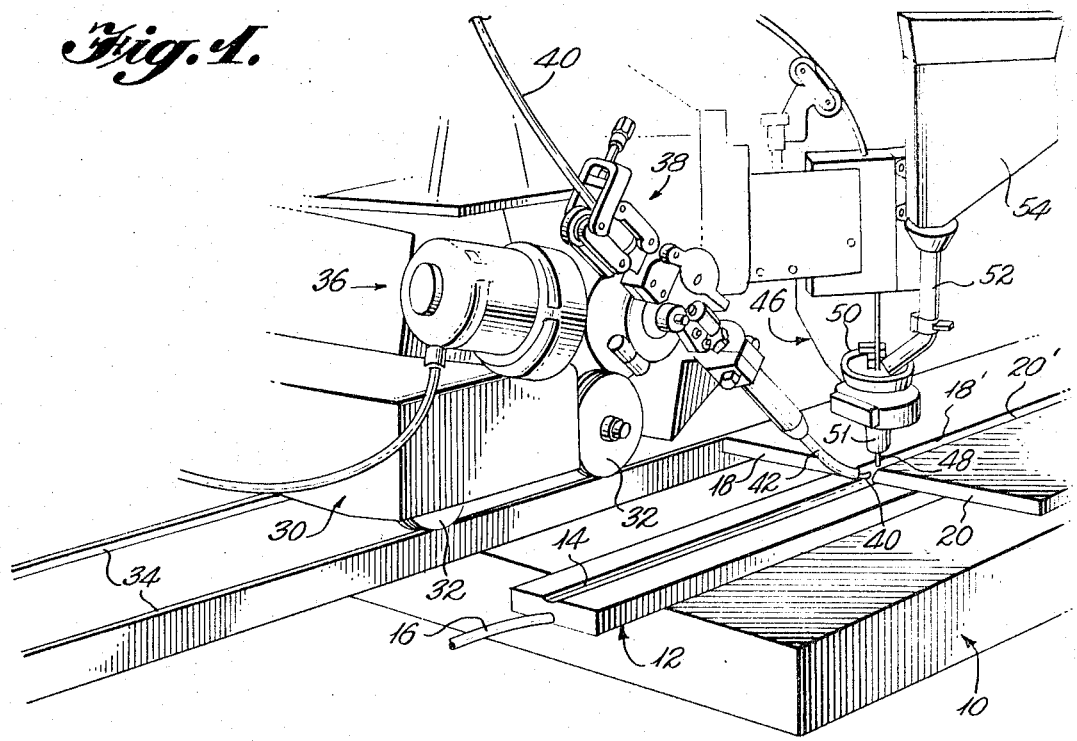
FIG. 1 is a top perspective view illustrating a typical apparatus which may be employed for carrying out the method of the present invention.

Referring now to the drawings wherein like reference characters designate corresponding parts throughout the several views, as seen particularly in FIG. 1, the apparatus for carrying out the method of the present invention includes a bed indicated generally by reference numeral 10 which supports a back-up means 12 thereon, this back-up means being formed of a suitable material such as copper or the like having high thermal conductivity. The back-up means has a longitudinally elongated arcuate groove 14 formed in the upper surface thereof, and a conduit 16 extends therethrough, this conduit being adapted to receive suitable cooling means such as water or the like which may be circulated through the chill back-up means during operation of the welding process.

A pair of workpieces 18 and 20 are disposed in operative position, these workpieces having edges 18' and 20' respectively which are spaced from one another and which are adapted to receive the hot and cold wires therebetween. These edges may either be disposed in substantially parallel relationship or may be beveled as desired for the particular weld being made. In any event, a root opening is provided of sufficient size to permit the cold wire to extend downwardly through such root opening and into the groove formed in the underlying back-up means. It will be noted that the workpieces rest directly upon the back-up means with the edges thereof disposed over the groove in the back-up means.

A relatively conventional automatic welding apparatus includes a carriage means 30 having wheels 32 thereon which are adapted to move along track members 34 to guide movement of the welding carriage during carrying out of the welding process. A drive means indicated by reference numeral 36 is adapted to drive the feed mechanism indicated generally by reference numeral 38 which in the present invention is adapted to feed a cold wire 40 downwardly through guide means 42 and into the groove in the chill back-up means.

A welding head 46 is suitably supported by the carriage and serves to support the hot wire or electrode 48. A funnel 50 is adapted to feed flux downwardly to a flux dispenser 51 which in turn deposits flux about the hot wire and into the space between the edges of the workpieces, this funnel receiving flux from a tube 52 connected with a suitable hopper 54.

It should be understood that the apparatus as illustrated in FIG. 1 is in the position which exists at the completion of a weld between the two workpieces 18 and 20, although as seen in FIG. 1, the weld is not illustrated as having been made.

Figure 2:
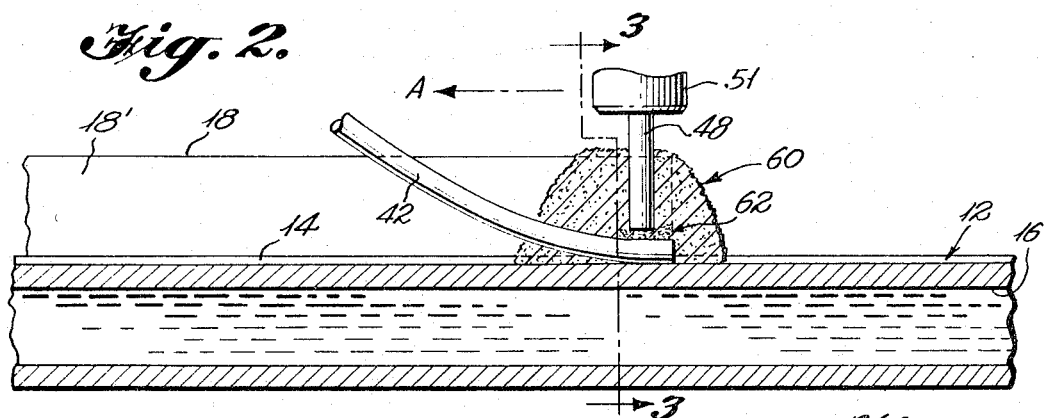
FIG. 2 is a longitudinal section through typical apparatus illustrating an initial step in carrying out the method of the present invention.
Figure 3:
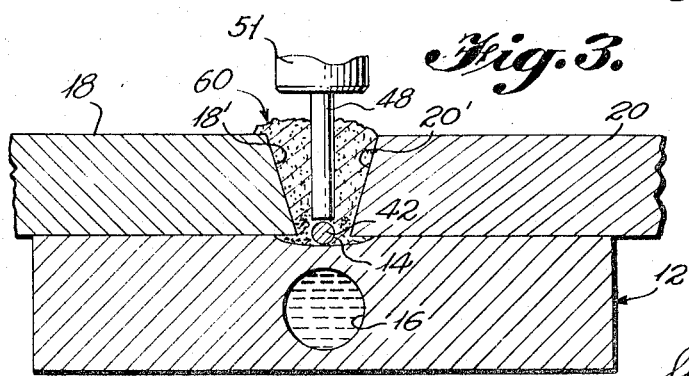
FIG. 3 is a sectional view taken substantially along line 3—3 of FIG. 2 looking in the direction of the arrows.

Referring now to FIGS. 2 and 3 of the drawings, the apparatus is illustrated in the initial position for carrying out the first step of the method according to the present invention. As seen in this figure, the hot wire 48 and the cold wire 42 are disposed between the edges of the two pieces, the hot wire 48 terminating at a point spaced above the back-up means, and the cold wire extending downwardly into the central bottom portion of the groove 14 in contact with the back-up means, the cold wire being spaced substantially beneath the hot wire. In a typical example, both the hot and cold wires may be formed of substantially the same material such as carbon steel or the like.

Figure 4:
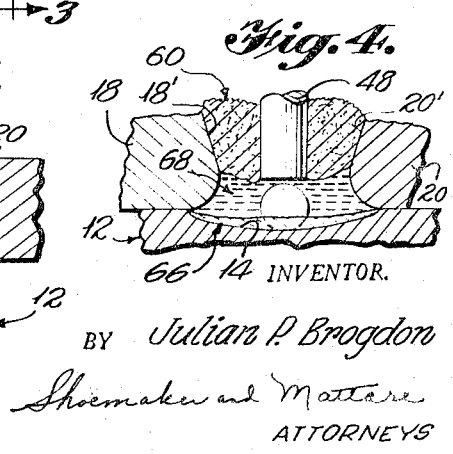
FIG. 4 is an enlarged sectional view illustrating a portion of the arrangement shown in FIG. 3 and in particular illustrating the manner in which the solid flux barrier layer is formed at the bottom of the groove in the back-up means.

A body of flux indicated by reference numeral 60 has been deposited about the hot and cold wires, and a suitable starter such as steel wool or the like 62 is illustrated in position between the spaced hot and cold wires, this starter being employed for initiating the arc when the process is first started. After the components are positioned as illustrated in FIGS. 2 and 3, the arc is initiated, and this produces a molten puddle as seen in FIG. 4 wherein the lower portion of the body of flux 60 is melted as well as adjacent portions of the edges 18' and 20' of the two workpieces 18 and 20 respectively. At the same time, the terminal end of the cold wire 42 is melted, and as it melts it absorbs heat at the bottom wall of groove 14 of the back-up means. The cooling effect provided by the cold wire which as mentioned previously comprises a ground potential electrode, augments the cooling effect of the chill back-up means so as to effectively form a solid flux barrier layer indicated by reference numeral 66 in FIG. 4. This barrier layer keeps the molten puddle indicated by reference numeral 68 away from the back-up means and insulates the arc from the back-up means to prevent melting of the back-up means and poisoning of the weld. This is very important since if any of the copper material of the back-up means should melt and enter into the finished weld, the quality of the weld will be seriously impaired, as well as causing damage to the back-up means itself. The back-up means may also in some cases be actually welded to the workpiece which of course is a very undesirable result.

As seen particularly in FIG. 2, the hot and cold wires 48 and 42 respectively are adapted to be moved between the edges of the workpieces and along the length thereof in the direction of arrow A. Accordingly, it will be noted that the cold wire extends in a direction forwardly of the movement of the wires throughout the welding process.

Referring now to FIG. 5, an intermediate stage of the welding process is illustrated. As noted in this figure, the cold wire 42 is preceding the hot wire 48 in the direction of movement as indicated by arrow A, and the terminal end 70 of the cold wire is melted off to join with the forward portion of the molten puddle 68 formed as the wires traverse along the edges of the workpieces. The completed weld portion is indicated by reference numeral 72.

As seen particularly in FIG. 6, the completed weld portion 72 does not extend vertically through the entire height of the workpieces 18 and 20, and obviously a subsequent pass is required to complete the weld.

As seen in FIGS. 7 and 8, the weld is completed by again passing the cold wire 42 and the hot wire 48 along between the edges of the workpieces. The subsequent portion 74 of the weld completes the weld. It has been found that the underbead 76 of the completed weld has a smooth, shiny surface and shows good reinforcement, or in other words, a good volume of the bead extends below the plane of the undersurfaces of the workpieces. It is of course understood that the second pass may be carried out simply by passing a hot wire along between the edges of the workpieces, although it is considered preferable to employ the cold wire in the second pass as well as in the first pass because of the aforementioned advantages in doing so.

Referring now to FIG. 9, a modification of the method of the present invention is illustrated wherein a tandem arrangement is employed. The back-up means 12' is substantially identical with the back-up means previously described and has a longitudinal groove 14' in the upper surface thereof and a conduit means 16' through the central portion thereof for receiving a cooling fluid.

The cold wire 42' and hot wire 48' correspond exactly to those previously described and traverse between the edges of the workpieces in the same manner as previously described to form the initial weld portion 80. Here again, the wires traverse in the direction of arrows A.

A second cold wire 81 and an associated hot wire 82 supported by a suitable welding head traverses between the edges of the workpieces in the same direction as wires 42' and 48', the cold and hot wires 81 and 82 trailing in the direction of movement of the wires 42' and 48'.

Wires 81 and 82 are surrounded by a body of flux 86 dispensed by a flux dispenser 84, wires 81 and 82 serving to complete the weld to form the weld portion 88 on top of the weld portion 80 formed by wires 48' and 42' respectively in advance of the wires 81 and 82.

It is evident that the tandem arrangement illustrated in FIG. 9 is adapted to form the complete weld in a single pass.

The method of the present invention may be employed with plates of widely varying thickness and may be employed with any material that lends itself to submerged arc welding. In general, the diameters of the hot and cold wires will be between about ⅛ inch and ¼ inch. In practice, carbon steel hot and cold wires and a neutral welding flux have proved to be successful. In a typical example, the welding process may be carried out at approximately 850 amps. and in a range of 30–32 volts A.C. A rate of traverse of about 14–16 inches per minute of the carriage with a cold wire feed of about 22–27 inches per minute has proved to be very successful.

It is apparent from the foregoing that there is provided according to the present invention a new and novel submerged arc welding process for seam welding workpieces entirely from one side thereof. The method according to the present invention effectively prevents the material of the back-up means from poisoning the completed weld. The invention method provides good fusion and a completed weld passes all standard tests. A smooth, shiny underbead is provided which exhibits good reinforcement. The method is quite simple and effective and can be carried out in a substantially automatic manner.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefor intended to be embraced by those claims.

I claim:

1. The method of seam welding metallic workpieces by a submerged arc welding process comprising, providing a chill back-up means having an elongated groove formed therein, positioning the edges of a pair of workpieces adjacent one another with said edges over the groove in the back-up means, disposing flux between said edges and in said groove, inserting a hot wire between said edges within said flux and spaced above said back-up means, producing an arc from said hot wire to melt the flux and adjacent portions of the workpieces to produce a molten puddle between said edges of the workpieces and in the groove, and providing a cold wire within said groove adjacent said hot wire to augment cooling of said molten puddle and flux within said groove adjacent to the surface of the groove to produce a solid flux layer to serve as a barrier layer to keep the molten puddle away from the back-up means and to insulate the arc from the back-up means to prevent melting of the back-up means and poisoning of the weld.

2. The method as defined in claim 1 wherein said cold wire is disposed in contact with the bottom of said groove in the back-up means.

3. The method as defined in claim 1 including the steps of moving said hot and cold wires along the length of said edges, said cold wire being disposed forwardly of said hot wire in the direction of movement.

4. The method as defined in claim 1 wherein said cold wire is spaced from said hot wire and is disposed substantially beneath said hot wire.

5. The method as defined in claim 1 wherein said cold wire is also disposed within said flux and is positioned within the central bottom portion of said groove.

6. The method as defined in claim 1 wherein said cold wire is of substantially the same material as said hot wire, said cold wire also being disposed within said flux and being positioned on the central bottom portion of said groove in contact with said back-up means, said cold wire being spaced from said hot wire and being disposed substantially beneath said hot wire, and including the step of moving said hot and cold wires along the length of said edges, said cold wire extending forwardly of said hot wire in the direction of movement of said wires.

7. The method as defined in claim 1 including the step of making a subsequent pass along the length of the weld formed by the steps set forth in claim 1, and wherein said subsequent pass is made by moving a hot wire between said edges along the length thereof and providing a cold wire adjacent said last-mentioned hot wire so as to complete the weld.

8. The method as defined in claim 1 including the steps of also moving a second hot wire and a second cold wire between said edges along the length thereof in trailing spaced relationship to said first-mentioned hot and cold wires in the direction of movement of the wires.

References Cited by the Examiner
UNITED STATES PATENTS

| | | | |
|---|---|---|---|
| 2,489,002 | 11/1949 | Babbitt | 219—73 |
| 2,511,976 | 6/1950 | Frost | 219—73 |
| 2,620,423 | 12/1952 | Komers et al. | 219—73 |
| 3,197,604 | 7/1965 | Turbyville et al. | 219—73 |
| 3,215,809 | 11/1965 | Morimoto et al. | 219—73 |

RICHARD M. WOOD, *Primary Examiner.*